(12) United States Patent
Lida et al.

(10) Patent No.: US 8,782,416 B2
(45) Date of Patent: Jul. 15, 2014

(54) FAMILY DWELLING RESTRICTED COMMUNICATION SYSTEM

(75) Inventors: Eyran Lida, Kfar Ha-Oranim (IL); Micha Risling, Raanana (IL); Gil Thieberger, Kiryat Tivon (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 807 days.

(21) Appl. No.: 12/550,638

(22) Filed: Aug. 31, 2009

(65) Prior Publication Data

US 2010/0058062 A1 Mar. 4, 2010

Related U.S. Application Data

(60) Provisional application No. 61/094,070, filed on Sep. 4, 2008.

(51) Int. Cl.
| | |
|---|---|
| *H04L 9/00* | (2006.01) |
| *H04N 7/173* | (2011.01) |
| *H04N 21/4627* | (2011.01) |
| *H04N 21/6377* | (2011.01) |
| *H04N 21/254* | (2011.01) |
| *H04N 7/167* | (2011.01) |
| *H04N 21/436* | (2011.01) |
| *H04L 12/28* | (2006.01) |
| *G06F 21/10* | (2013.01) |

(52) U.S. Cl.
CPC ............ *H04N 7/1675* (2013.01); *H04N 21/436* (2013.01); *H04N 7/17318* (2013.01); *H04L 2209/60* (2013.01); *H04N 21/4627* (2013.01); *H04N 21/63775* (2013.01); *H04L 12/2803* (2013.01); *G06F 2221/2111* (2013.01); *G06F 21/10* (2013.01); *H04N 21/2541* (2013.01)
USPC ............................ 713/171; 380/200; 713/168

(58) Field of Classification Search
CPC ........... H04L 2209/60; H04L 12/2803; H04N 21/254; H04N 21/436; G06F 2221/2111; G06F 21/101
USPC .................................. 713/171, 168; 380/200
See application file for complete search history.

(56) References Cited

U.S. PATENT DOCUMENTS

| | | | |
|---|---|---|---|
| 2005/0071278 A1* | 3/2005 | Simelius ......................... 705/52 |
| 2005/0076092 A1* | 4/2005 | Chang et al. ................... 709/217 |
| 2005/0272405 A1* | 12/2005 | Tomlinson et al. ........ 455/404.2 |
| 2006/0069911 A1* | 3/2006 | Takabayashi et al. ........ 713/150 |
| 2007/0178884 A1* | 8/2007 | Donovan et al. .............. 455/411 |
| 2007/0217436 A1* | 9/2007 | Markley et al. ............... 370/401 |
| 2008/0010652 A1* | 1/2008 | Booth .............................. 725/1 |
| 2008/0022003 A1* | 1/2008 | Alve .............................. 709/229 |
| 2008/0112405 A1* | 5/2008 | Cholas et al. .................. 370/389 |
| 2009/0254746 A1* | 10/2009 | Aihara et al. .................. 713/168 |

OTHER PUBLICATIONS

HomePlug Powerline Alliance, "HomePlug AV White Paper", v050818 (Aug. 18, 2005).*

(Continued)

*Primary Examiner* — Jung Kim
*Assistant Examiner* — Theodore Parsons

(57) ABSTRACT

A network comprising an authentication network limited to a family dwelling; a content source; and a content receiver. Wherein the content source is configured to transmit encrypted content to the content receiver, and the content receiver can decode the encrypted content only when both the content source and the content receiver are physically connect to the authentication network.

18 Claims, 12 Drawing Sheets

(56) References Cited

OTHER PUBLICATIONS

Bhatti, G.; Sahinoglu, Z.; Peker, K.A.; Guo, J.; Matsubara, F.; , "A TV-centric home network to provide a unified access to UPnP and PLC domains," Networked Appliances, 2002. Gaithersburg. Proceedings. 2002 IEEE 4th International Workshop on , vol., No., pp. 234-242 (2002).*

* cited by examiner

FAMILY DWELLING RESTRICTED COMMUNICATION SYSTEM

CROSS-REFERENCE TO RELATED APPLICATIONS

This application claims the benefit of U.S. Provisional Patent Application No. 61/094,070, filed Sep. 4, 2008.

BACKGROUND

Basic principles and details relating to networks and authentication networks needed for properly understanding the embodiments of the present invention are provided herein. Complete theoretical descriptions, details, explanations, examples, and applications of these, related subjects, and phenomena are readily available in standard references in the fields of network communication.

There are location dependent needs to prevent the distribution of protected content and control the operation of protected software. For example, there is a need to prevent distribution of protected content and software outside the family dwelling or other defined areas.

Power Line Communication (PLC) is a known technology, available from many providers such as X10 and Insteon (http://www.insteon.net). PLC is limited to communications over the same power line, such as inside the family dwelling. Usually, PLC is limited to one phase. Devices that are not coupled to that phase will not receive the communication over the phase.

BRIEF SUMMARY

In one embodiment, a network comprising an authentication network; a content source; a content receiver; and a connection between the content source and the content receiver. Wherein communicating content between the source and the receiver is allowed only when both the source and the receiver are physically connect to the authentication network, and the bandwidth capability of the connection between the content source and the content receiver is much higher than the bandwidth capability of the authentication network.

In one embodiment, a network comprising an authentication network limited to a family dwelling; a content source; and a content receiver. Wherein the content source is configured to transmit encrypted content to the content receiver, and the content receiver can decode the encrypted content only when both the content source and the content receiver are physically connect to the authentication network.

In one embodiment, a network comprising an authentication network based on a power line communication network; a primary network configured to distribute encrypted content beyond the power line communication network; a content source; and a content receiver. Wherein the overlapping between the primary network and the power line communication network determines the maximum allowed distance for distributing the encrypted content.

Implementations of the disclosed embodiments involve performing or completing selected tasks or steps manually, semi-automatically, fully automatically, and/or a combination thereof. Moreover, depending upon actual instrumentation and/or equipment used for implementing the disclosed embodiments, several embodiments could be achieved by hardware, by software, by firmware, or a combination thereof. In particular, with hardware, embodiments of the invention could exist by variations in the physical structure. Additionally, or alternatively, with software, selected functions of the invention could be performed by a data processor, such as a computing platform, executing software instructions or protocols using any suitable computer operating system.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Figure 1:
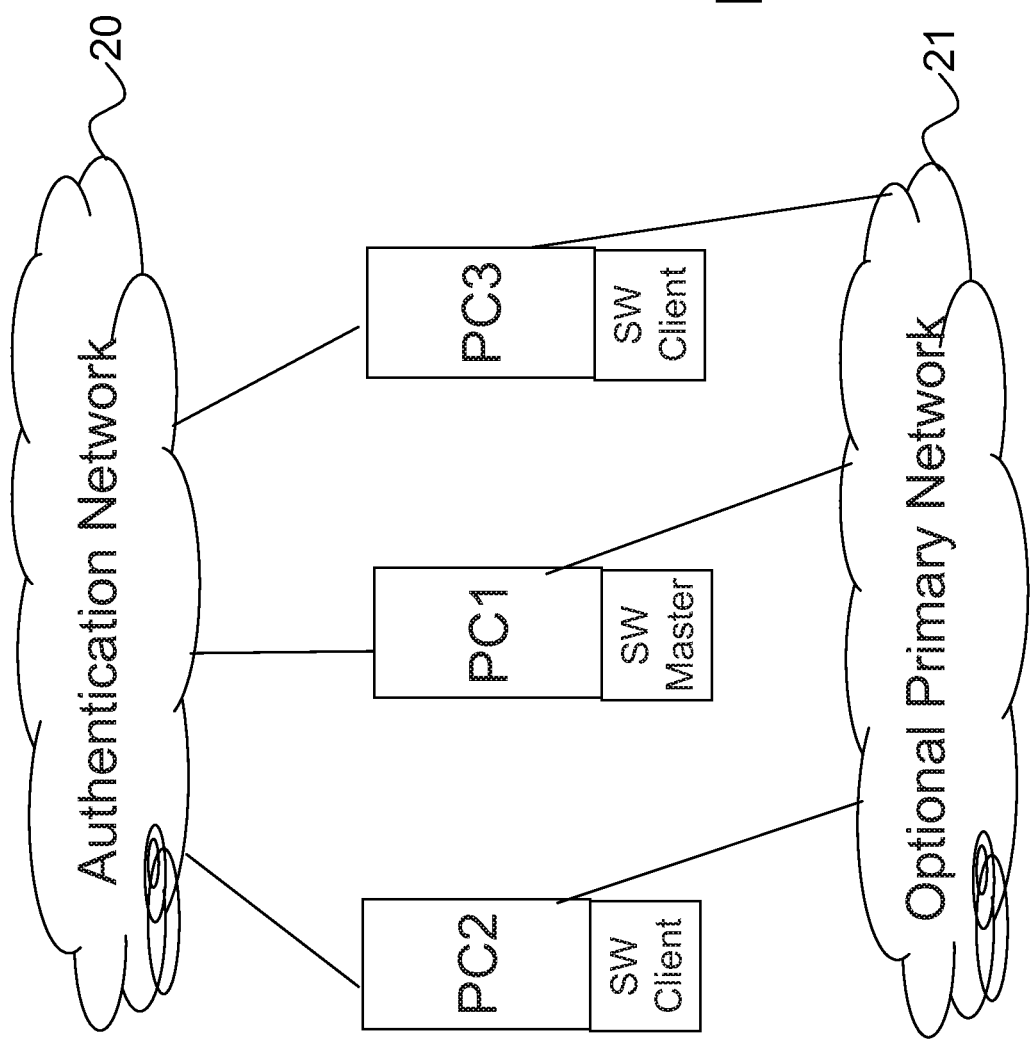
FIG. 1 illustrates one embodiment of a software license limited to the physical span of the authentication network.

In the following description, numerous specific details are set forth. However, the embodiments of the invention may be practiced without some of these specific details. In other instances, well-known hardware, software, materials, structures and techniques have not been shown in detail in order not to obscure the understanding of this description. In this description, references to "one embodiment" mean that the feature being referred to may be included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein. Also herein, flow diagrams illustrate non-limiting embodiment examples of the methods, and block diagrams illustrate non-limiting embodiment examples of the devices. Some operations in the flow diagrams may be described with reference to the embodiments illustrated by the block diagrams. However, the methods of the flow diagrams could be performed by embodiments of the invention other than those discussed with reference to the block diagrams, and embodiments discussed with reference to the block diagrams could perform operations different from those discussed with reference to the flow diagrams. Moreover, although the flow diagrams may depict serial operations, certain embodiments could perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. Furthermore, methods and mechanisms of the embodiments will sometimes be described in singular form for clarity. However, it should be noted that some embodiments may include multiple iterations of a method or multiple instantiations of a mechanism unless noted otherwise. For example, when a controller or an interface are disclosed in an embodiment, the scope of the embodiment is intended to also cover the use of multiple controllers or interfaces.

In one embodiment, power line communication is used for conveying a security protocol that is not transmitted outside of the family dwelling. The power line communication network is also referred to herein as an authentication network.

In one embodiment, a main channel, also referred to as a primary channel, is used for content distribution. The main channel may be capable of transmitting over long distances. The authentication channel/network is formed by the power line communication over the power lines such that the power line communication limits the span of the participating devices to the family dwelling.

Contrary to optional primary networks that may feature almost unlimited distribution characteristics, power line communication is limited to the home and the overlapping between the primary network and the power line communication network (or authentication network) determines the maximum allowed distribution.

FIG. 1 illustrates one embodiment of a software license limited to the physical span of the authentication network 20. Optionally, the entire software license logic is implemented in software. In one embodiment, a single software license is installed on a master computer that is coupled to the authentication network 20. Other computers (PC1, PC2, and PC3), referred to as clients, which are also coupled to the authentication network, may use the software, optionally over the primary network 21, without having an installed software license. In one embodiment, the master and the clients run different software versions. The number of clients may be limited as needed. Clients that are not connected to the authentication network cannot run the protected software.

Optionally, the master computer can communicate with the authentication network in order to authorize the client computers. Reauthentication may be performed from time to time, as needed.

Figure 2:
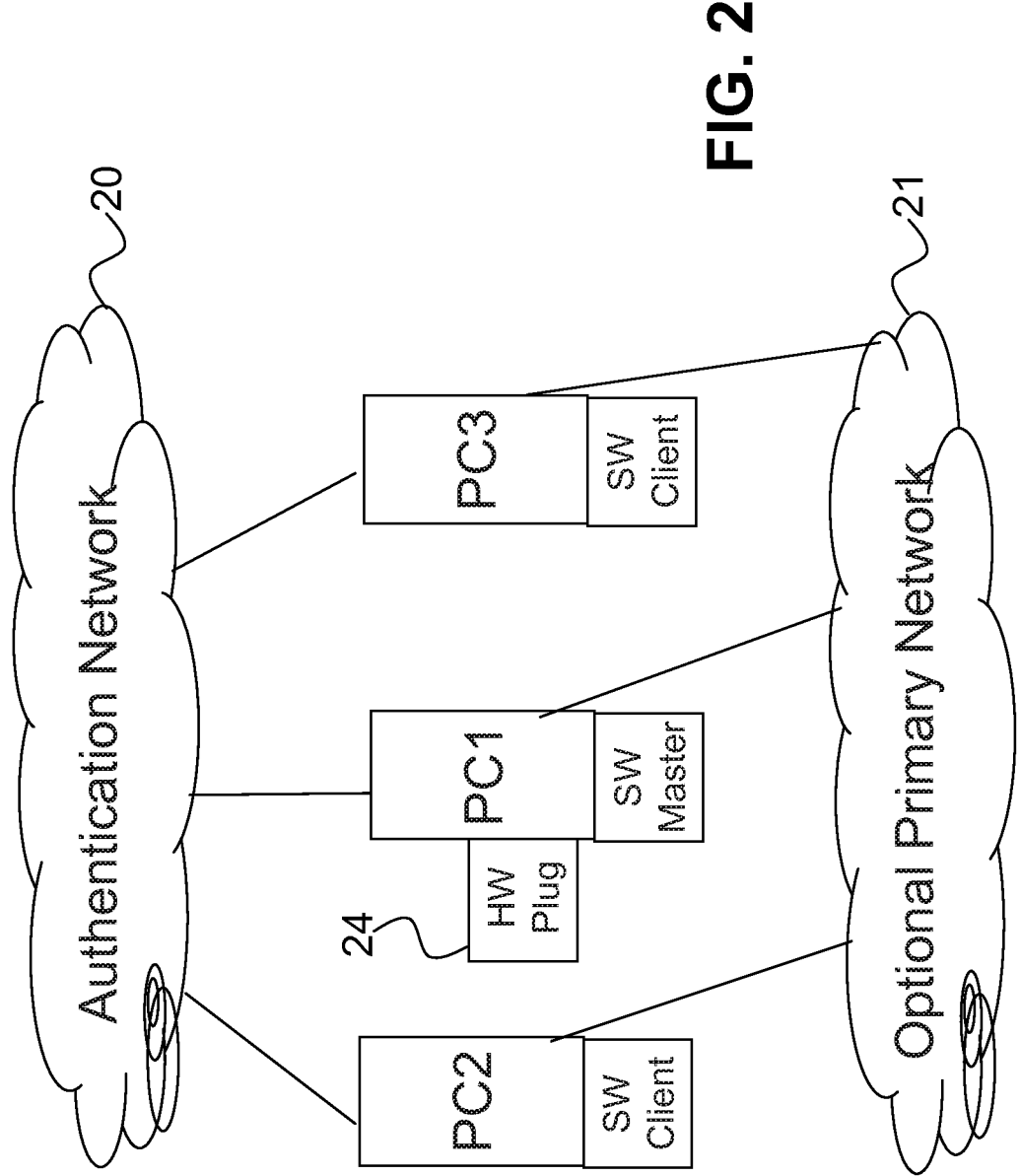
FIG. 2 illustrates one embodiment of a software license limited to the physical span of the authentication network with the addition of a hardware plug.

FIG. 2 illustrates one embodiment similar to the embodiment illustrated in FIG. 1 with the addition of a hardware plug 24. Optionally, the master computer runs specific software that enables it to operate the hardware plug 24. Alternatively, the master computer and the clients run the same software and the hardware plug 24 acts as the authentication master. This option has the great benefit of installing only one software on all computers, wherein the authentication management is performed by the hardware plug. In one embodiment, the software illustrated in FIG. 2 has two or more modes of operation. The first mode of operation recognizes the hardware plug and becomes a license manager, also referred to as a software master. The second mode of operation is operated when the computer is not coupled to the hardware plug, also referred to as a software client, in which case the computer connects to the authentication network in order to authenticate the software. In one embodiment, in order for a client to run the protected software, a software master (coupled to a hardware plug) has to be coupled to the authentication network.

Figure 3:
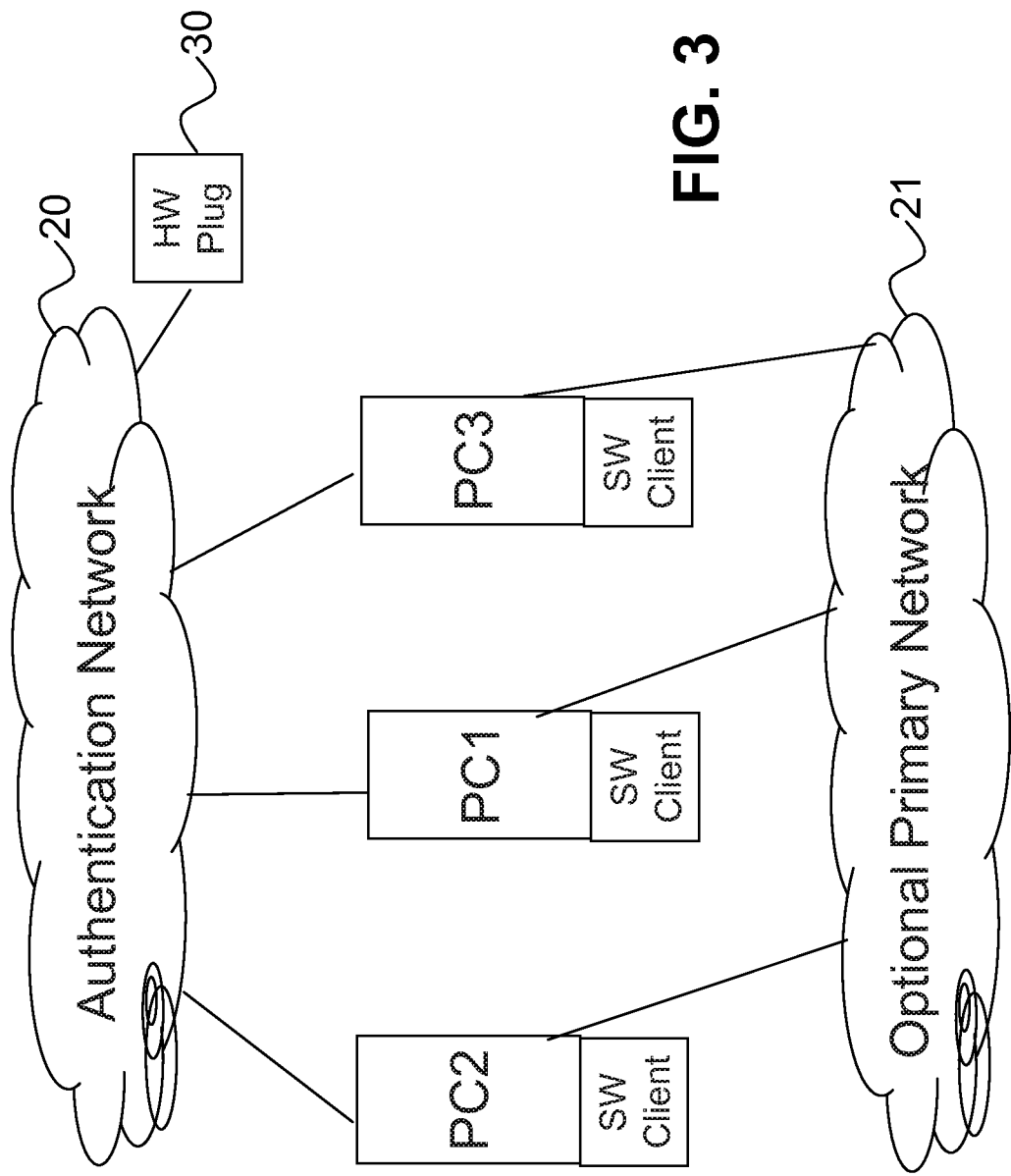
FIG. 3 illustrates one embodiment of a software license manager implemented as an independent hardware plug.

FIG. 3 illustrates one embodiment of a software license manager implemented as an independent hardware plug 30. The hardware plug 30 may not be directly connected to one of the computers, but coupled to the authentication network 20. Optionally, the clients search for the hardware plug 30 over the authentication network 20, and connect to the hardware plug 30. This embodiment requires the installation of only one software version on the computers and, simultaneously, coupling the hardware plug 30 to the authentication network 20 for authenticating the clients. In one embodiment, a user connects the hardware plug 30 into one socket of the authentication network 20 and all clients, or up to a predefined number of clients, are able to authenticate the software using the hardware plug 30.

In one embodiment, the hardware plug 30 is capable of authorizing a plurality of softwares. In one embodiment, additional software licenses are added by chaining the hardware plugs 30. In one embodiment, a single hardware plug 30 manages a plurality of softwares. In one embodiment, the hardware plug 30 is programmed, optionally online through the Internet, with the software licenses to be authenticated. The hardware plug 30 programming may be achieved by communicating with an authentication server.

Figure 4:
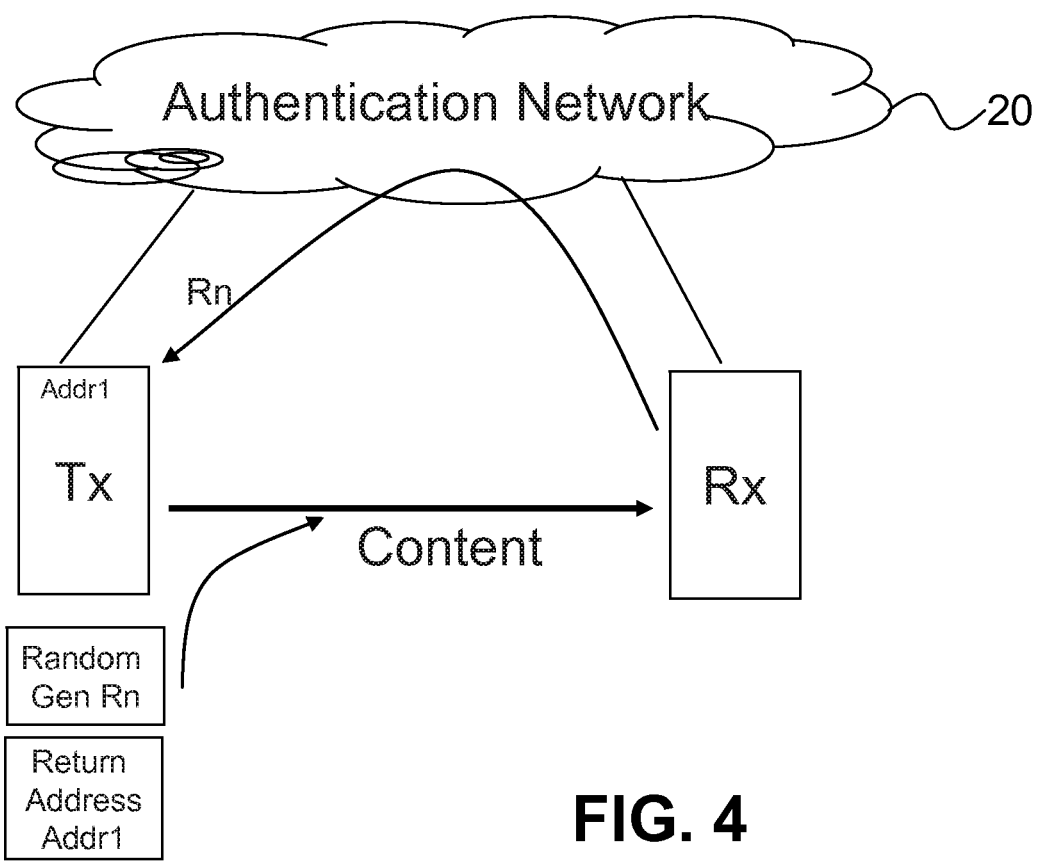
FIG. 4 illustrates one embodiment of a point-to-point connection between a data provider, referred to as Tx, and a data receiver, referred to as Rx.

FIG. 4 illustrates one embodiment of a point-to-point connection between a data provider, referred to as Tx, and a data receiver, referred to as Rx. It is to be understood that the data may be any required data such as video, multimedia, audio, scientific data, or any other data. Optionally, the Tx multiplexes the content with (i) random or pseudo random data (referred to as random data or Rn data), and (ii) its destination addresses of the authentication network 20. Then the Rx uses the Tx destination addresses for returning, through the authentication network, the random data received from the Tx. The Rx may manipulate the random data received from the Tx using an appropriate mechanism. When the Tx receives the random data from the Rx through the authentication network 20, it is likely that the Tx and the Rx are located within the required area bounded by the authentication network 20.

Figure 5:
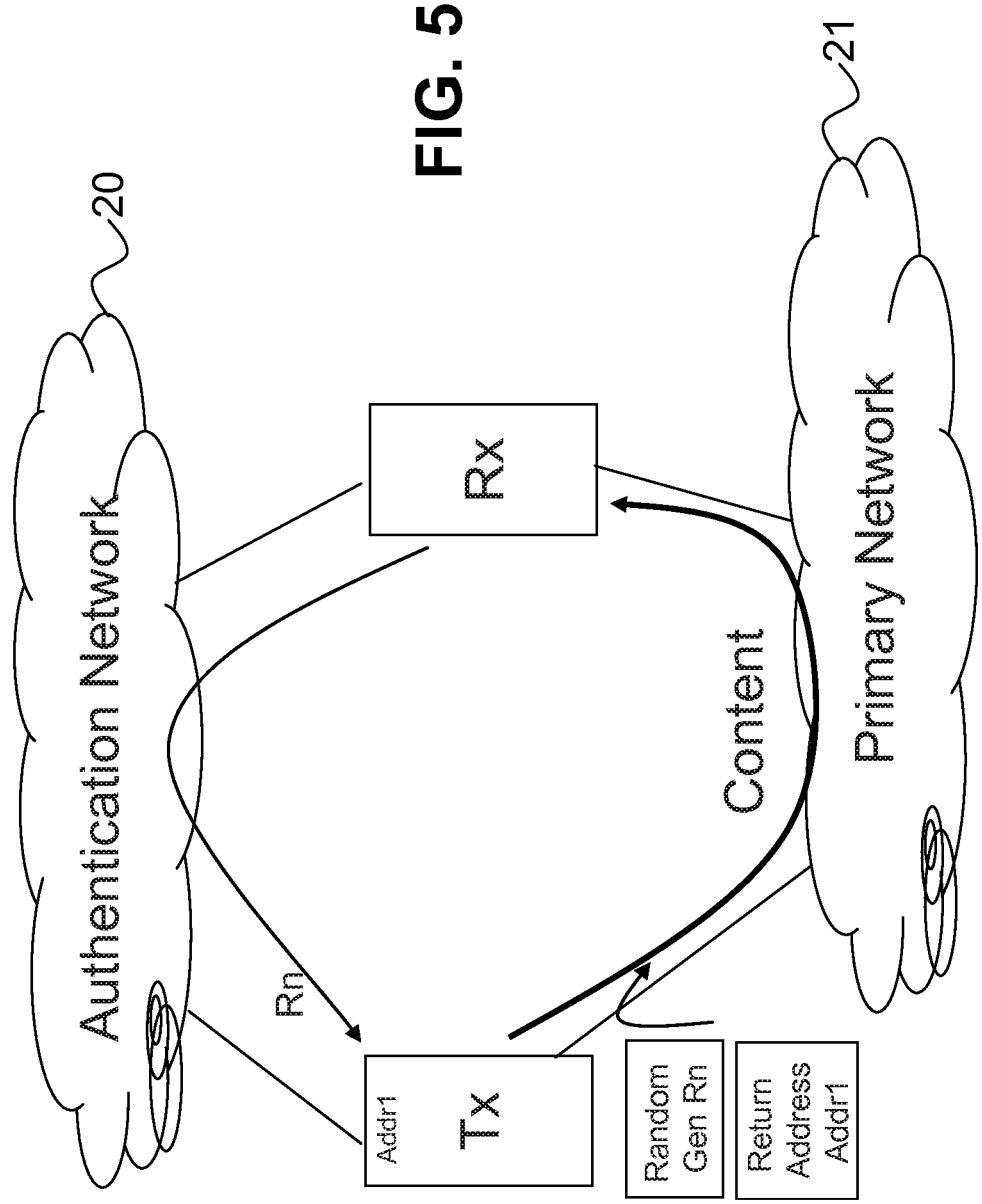
FIG. 5 illustrates one embodiment of point-to-point communication over a network, wherein the network may include devices such as switches and hubs.

FIG. 5 illustrates one embodiment of point-to-point communication over a primary network 21, wherein the primary network 21 may include devices such as switches and hubs. The Rx may manipulate the random data with its network address. The primary network 21 may be any available network, such as a general purpose network that supports point-to-point sessions.

Figure 6:
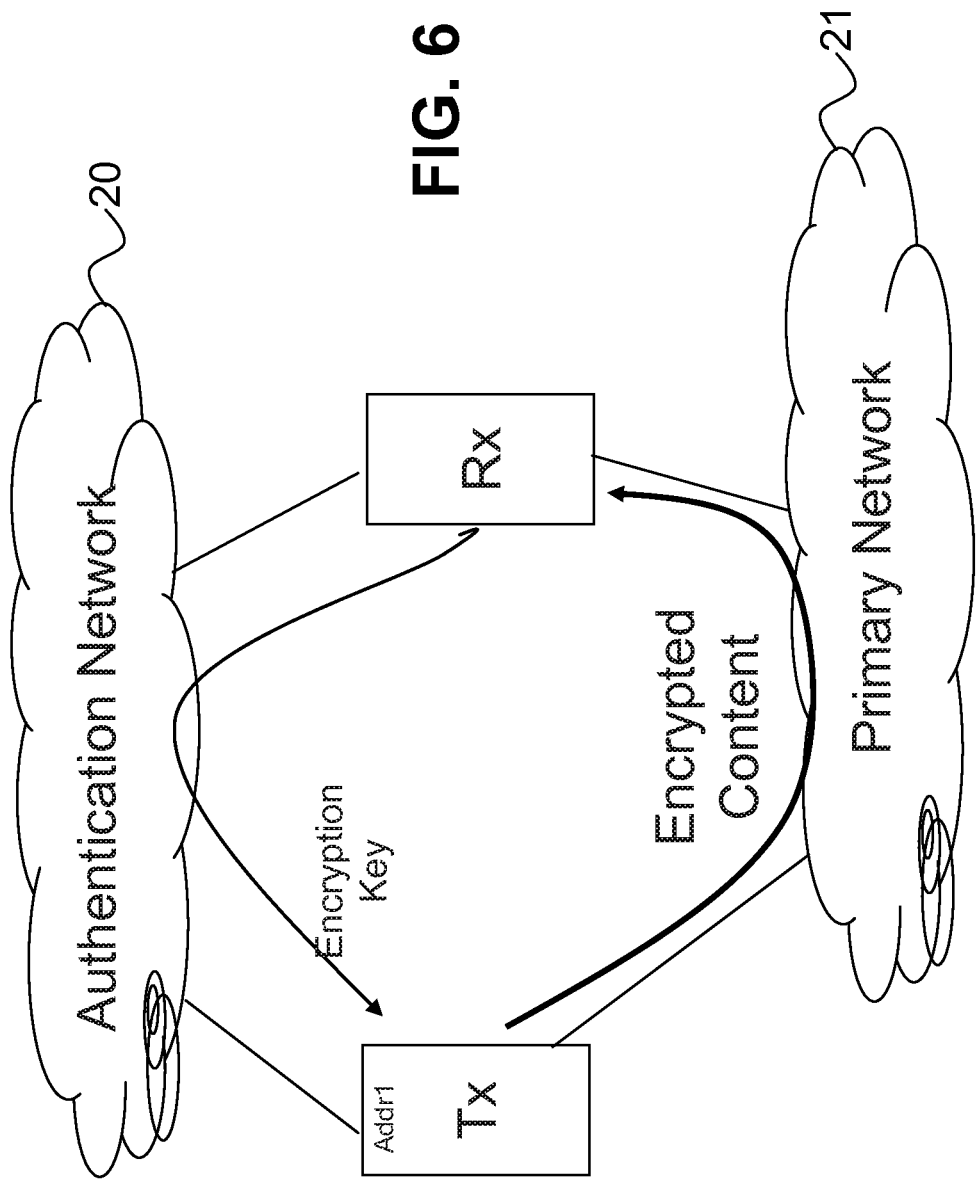
FIG. 6 illustrates one embodiment of receiving an encryption key, encrypting the content, and transmitting the encrypted content over the primary network.

FIG. 6 illustrates one embodiment where the Tx receives an encryption key from the Rx over the authentication network 20, encrypts the content using the encryption key received from the Rx, and transmits the encrypted content over the primary network 21. Due to the fact that the content is encrypted, the primary network 21 may be a network that enables a first device to sniff communications belonging to a second device, such as an Ethernet network; the primary network 21 may also include other devices and shared resources.

Encrypting the content limits a possible distribution of the content because in order to be able to decrypt, the receiver has to be coupled to the authentication network, and therefore has to be located within the predefined area. A receiver that is not coupled to the authentication network cannot transmit an encryption key, and therefore cannot receive encrypted content which it can decrypt.

Figure 7:
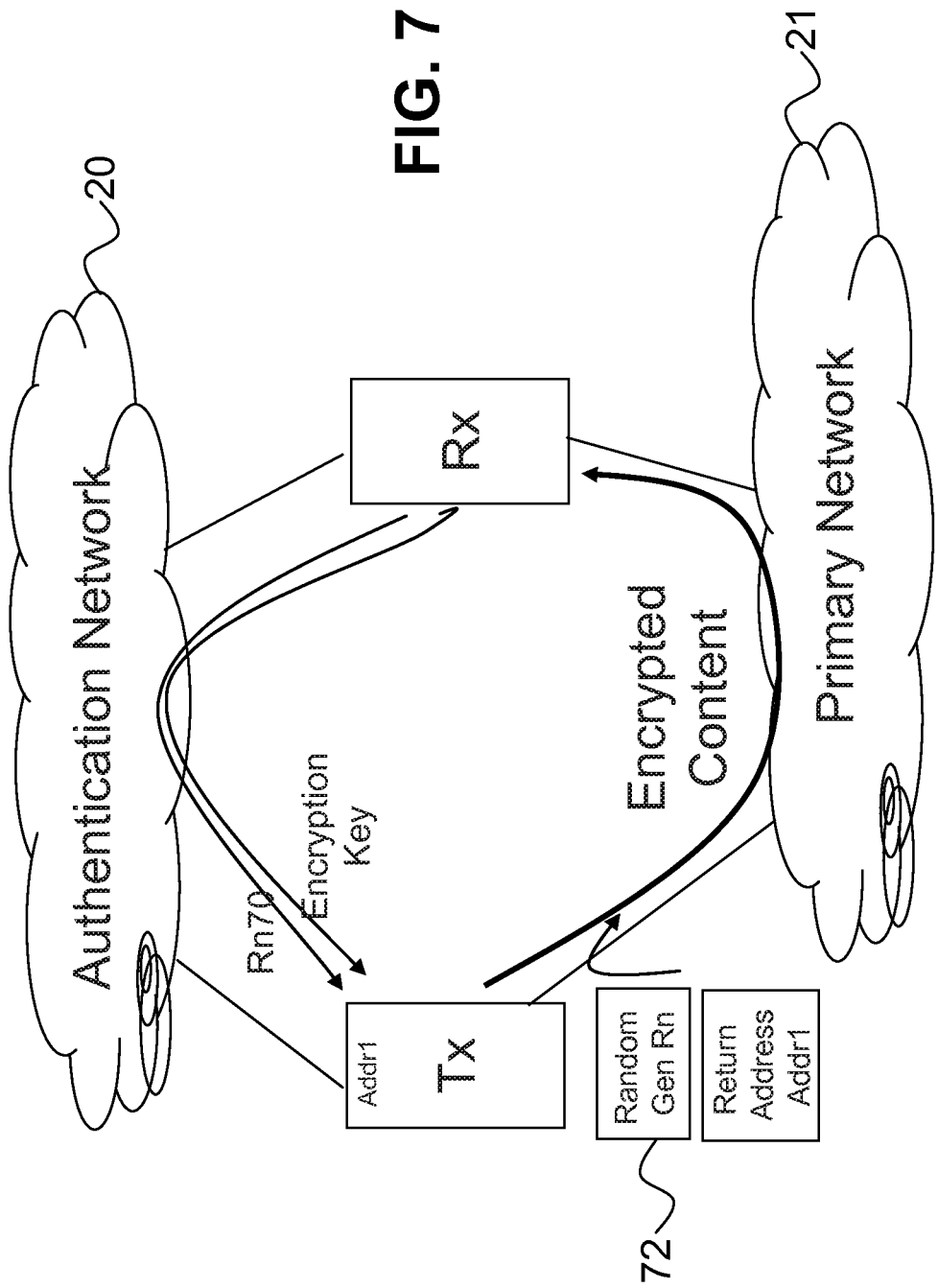
FIG. 7 illustrates one embodiment with double protection.

FIG. 7 illustrates one embodiment wherein the Tx transmits: (i) content that was encrypted using an encryption key received from the Rx, (ii) its address on the authentication network, and (iii) random or pseudo random data from random generator 72 and Rn70. The Rx has to use the received address of the Tx on the authentication network for returning the random data and the encryption key. This embodiment provides double protection because the content is encrypted and the Rx has to return the security number.

Figure 8:
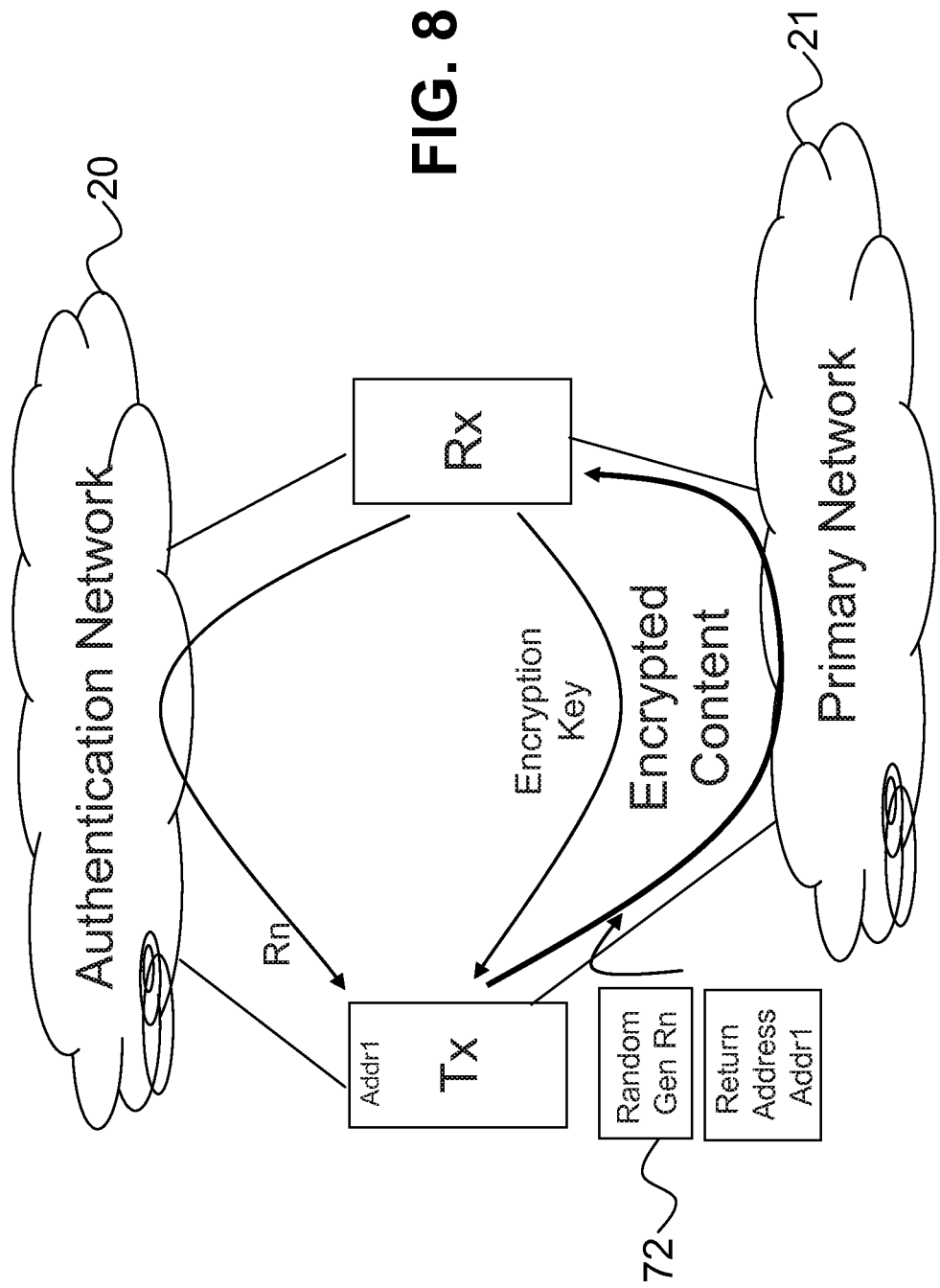
FIG. 8 illustrates one embodiment with double protection wherein the encryption key is transmitted over the primary network.

FIG. 8 illustrates one embodiment similar to the embodiment illustrated by FIG. 7, but wherein the encryption key is transmitted over the primary network 21. In one example, this embodiment enables a strong encryption using a very slow authentication network 20. In another example, the embodiment adds another security level to a legacy network. In one example, the primary network 21 utilizes HDMI HDCP and the authentication network 20 utilizes power line communication (PLC).

In one embodiment, the random data is multiplexed with the encrypted content. In another embodiment, the primary network 21 includes a mechanism for transmitting general data and the random data utilizes that mechanism. In one embodiment, using a high throughput primary network 21 enables the use of an encryption protocol requiring frequent updates of the encryption key.

Figure 9:
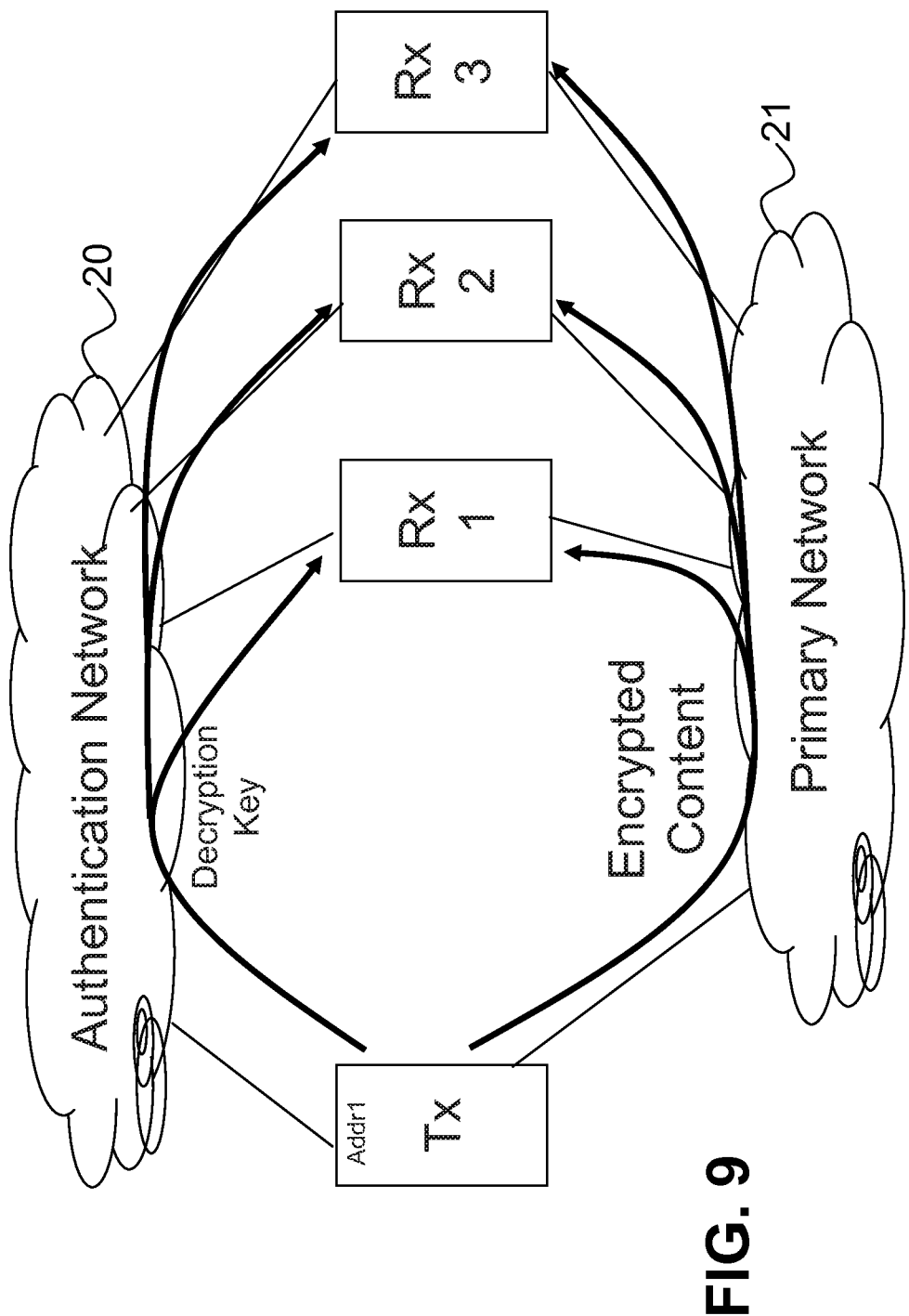
FIG. 9 illustrates one embodiment using a primary network supporting broadcast and/or multicast transmissions.

FIG. 9 illustrates one embodiment using a primary network 21 supporting broadcast and/or multicast transmissions. The ability of unauthorized stations to receive the broadcast transmissions is not a concern because the content is encrypted and the decryption key is transmitted over the authentication network 20. Therefore, only stations coupled to the authentication network 20 can receive the decryption key and decrypt the broadcasted transmission. In one embodiment, the primary network 21 and/or the authentication network 20 are bidirectional and the Rx also transmits to the Tx.

Figure 10:
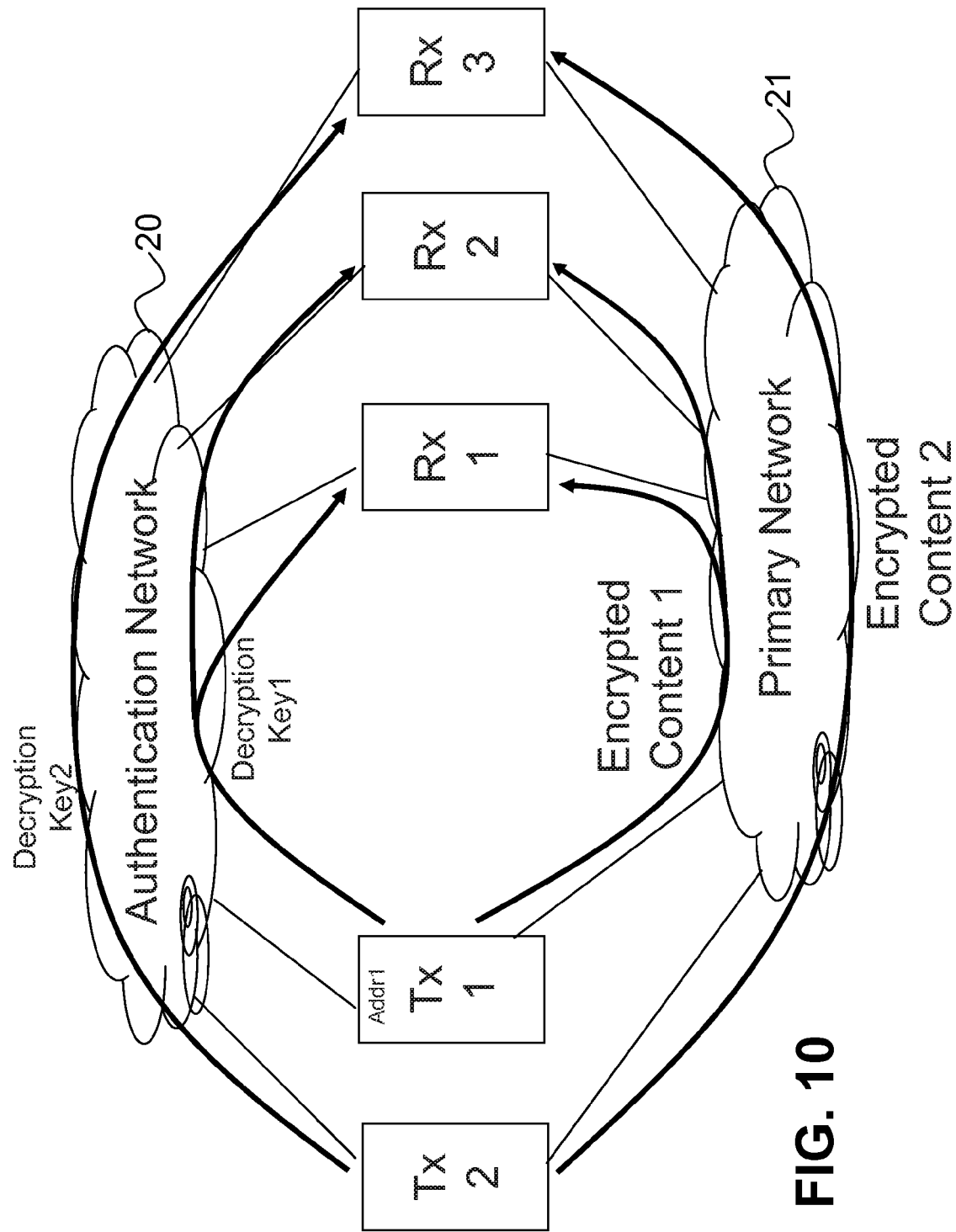
FIG. 10 illustrates one embodiment using a primary network supporting broadcast and/or multicast transmissions, with multiple simultaneous sessions.

FIG. 10 illustrates one embodiment similar to FIG. 9 but with multiple simultaneous sessions.

Figure 11:
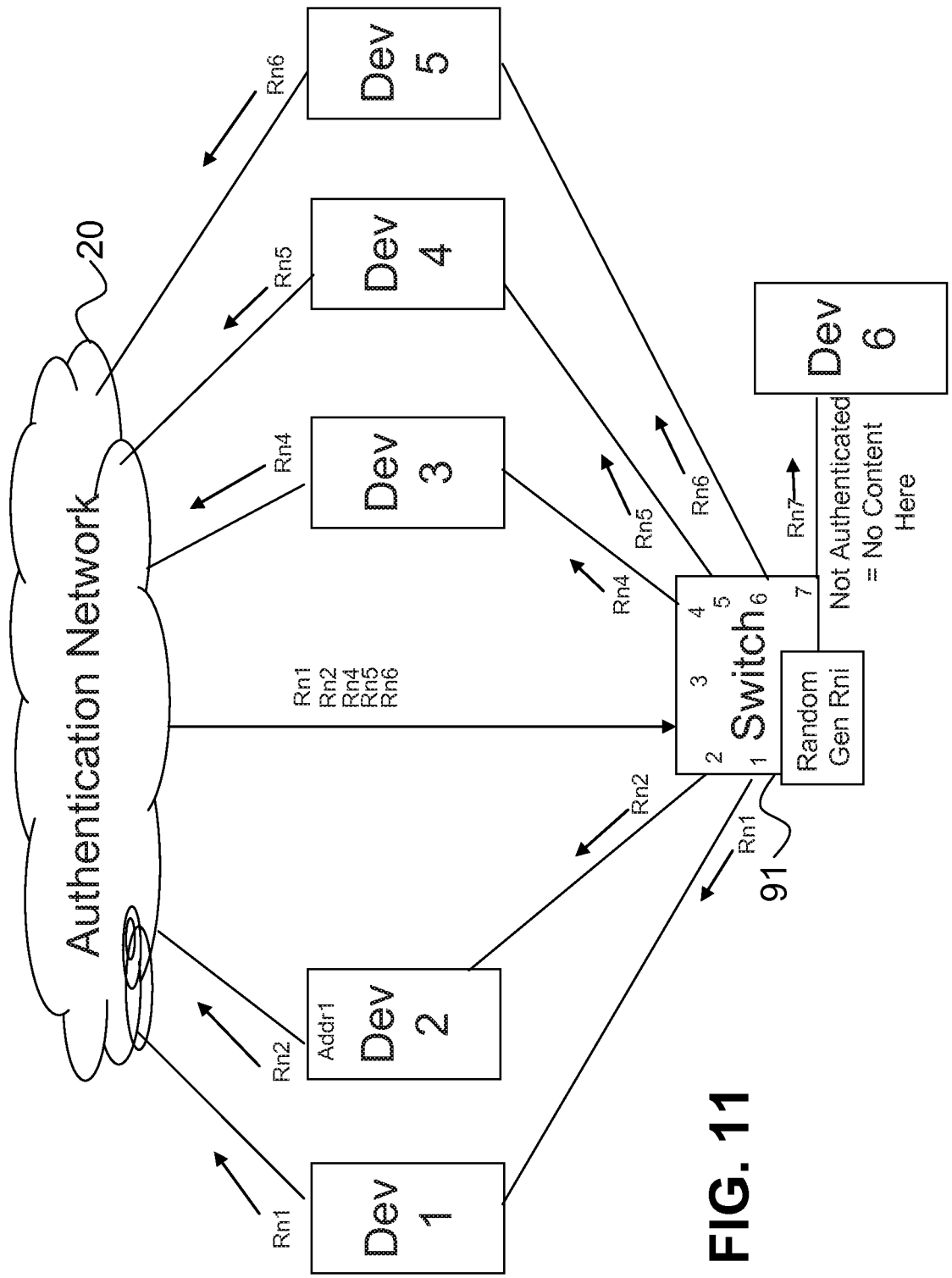
FIG. 11 illustrates one embodiment of a network comprising a plurality of devices.

FIG. 11 illustrates one embodiment of a network comprising a plurality of devices (DEV 1 to DEV 5). Some of the devices may transmit contents and some of the devices may receive the contents. The content may be encrypted or unencrypted. The switch 91, which is coupled to the authentication network 20, determines the direction of the various transmissions over the network and enables protected communications only to devices that are also coupled to the authentication network 20. In one embodiment, the switch 91 transmits random data to the devices, the devices return the random data to the switch 91, and for protected content the switch 91 only enables ports associated with devices from which the random data was received by the switch 91 through the authentication network 20. In one embodiment, the primary network (not illustrated in the figure) may be a proprietary network that interconnects between devices that are coupled to the authentication network 20. In order to be qualified to receive or transmit protected data, a device in the network has to be connected to the authentication network 20 and to return the random data. Optionally, the devices in the embodiment illustrated by FIG. 11 have to be connected through the switch 91, and optionally, the devices include a protection in the device level against point-to-point connection of devices.

The switch 91 may also be a hub. The hub may shut down ports from which it does not receive authentication, and, as described, the authentication can be received only through the authentication network 20. The switch and/or the hub sample their ports periodically through the authentication network 20, and only when the port is authenticated—the communication between the devices is enabled.

Figure 12:
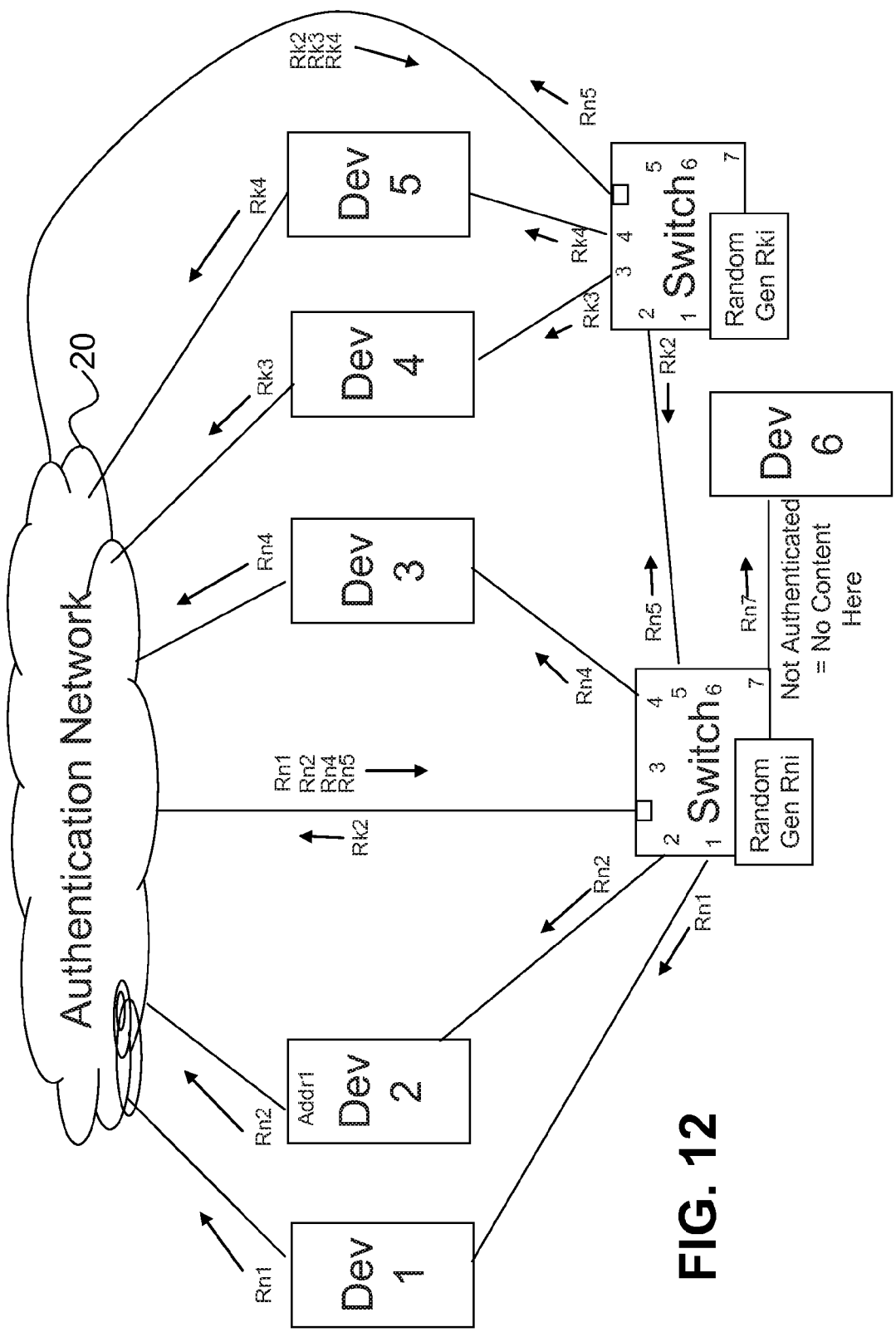
FIG. 12 illustrates one embodiment of a network comprising a plurality of switches or hubs.

FIG. 12 illustrates one embodiment of a network comprising a plurality of switches or hubs. Because each transmitting port is authenticated through the authentication network 20, it is assured that all of the devices in the network are located in the same domain, even if there are a plurality of switches, hubs and other devices.

Certain features of the embodiments, which, for clarity, may have been described in the context of separate embodiments, may also be provided in various combinations in a single embodiment. Conversely, various features of the embodiments, which, for brevity, may have been described in the context of a single embodiment, may also be provided separately or in any suitable sub-combination.

The embodiments are not limited in their applications to the details of the order or sequence of steps of operation of methods, or to details of implementation of devices, set in the description, drawings, or examples.

While the methods disclosed herein have been described and shown with reference to particular steps performed in a particular order, it will be understood that these steps may be combined, sub-divided, or reordered to form an equivalent method without departing from the teachings of the embodiments. Accordingly, unless specifically indicated herein, the order and grouping of the steps is not a limitation of the embodiments.

Any citation or identification of any reference in this application shall not be construed as an admission that such reference is available as prior art to the embodiments of the present invention.

While the embodiments have been described in conjunction with specific examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents. In the claims, means-plus-function clauses are intended to cover the structures described herein as performing the recited function and not only structural equivalents, but also equivalent structures.

What is claimed is:

1. A network comprising:
   an authentication network; a content source; a content receiver; and a connection between the content source and the content receiver;
   wherein communicating content between the source and the receiver over the connection is allowed only when both the source and the receiver are physically connected to the authentication network;
   the bandwidth capability of the connection is higher than the bandwidth capability of the authentication network; and
   wherein the content source is configured to send on the connection the content with pseudo random data and destination address of the authentication network; and the content receiver is configured to use the destination address for returning, through the authentication network, at least one of: the pseudo random data, and a manipulation of the pseudo random data.

2. The network of claim 1, wherein the authentication network is based on a family dwelling power line communication network.

3. The network of claim 2, wherein the content comprises high-definition video data.

4. The network of claim 3, wherein the content is an encrypted content, and the source is configured to transmit the encrypted content to the receiver over a point to point connection.

5. The network of claim 3, wherein the content is an encrypted content, and the source is configured to transmit encrypted content to the receiver over a primary network.

6. The network of claim 2, wherein the content is an encrypted content, the source is configured to transmit the encrypted content to the receiver over the connection, and the source and the receiver are further configured to communicate decryption related data over the authentication network.

7. A network comprising: an authentication network limited to a family dwelling; a content source; a content receiver, and a connection between the content source and the content receiver;
the content source is configured to transmit encrypted content to the content receiver over the connection;
the content receiver is configured to decode the encrypted content only when both the content source and the content receiver are physically connected to the authentication network; wherein the authentication network and the connection are not merged; and
wherein the content source is configured to send, on the connection, the content with pseudo random data and destination address of the authentication network; and the content receiver is configured to use the destination address for returning, through the authentication network, at least one of: the pseudo random data, and a manipulation of the pseudo random data.

8. The network of claim 7, wherein the authentication network is based on a family dwelling power line communication network.

9. The network of claim 8, wherein the content comprises high-definition video data.

10. The network of claim 9, wherein the content receiver is configured to transmit an encryption key to the content source; and the content source is configured to encrypt the content using the encryption key and to transmit the encrypted content to the content receiver over a point to point connection.

11. The network of claim 9, wherein the content receiver is configured to transmit an encryption key to the content source; and the content source is configured to encrypt the content using the encryption key and to transmit the encrypted content to the content receiver over a primary network.

12. A network comprising:
an authentication network based on a power line communication network;
a primary network configured to distribute encrypted content beyond the power line communication network;
a content source; and
a content receiver;
wherein the overlapping between the primary network and the power line communication network determines the maximum allowed distance for distributing the encrypted content over the primary network; and
wherein the content source is configured to send, on the primary network, the content with pseudo random data and destination address of the authentication network; and the content receiver is configured to use the destination address for returning, through the authentication network, at least one of: the pseudo random data, and a manipulation of the pseudo random data.

13. The network of claim 12, wherein the power line communication network is a family dwelling power line communication network.

14. The network of claim 12, wherein both the content source and content receiver have to be physically connected to the authentication network in order to encrypt and decrypt the content.

15. The network of claim 12, further comprising a hardware plug configured to operate as an authentication master.

16. The network of claim 15, wherein the content source and the content receiver search for the hardware plug over the authentication network.

17. The network of claim 12, wherein the content receiver is configured to transmit an encryption key to the content source; and the content source is configured to encrypt the content using the encryption key and to transmit the encrypted content to the content receiver over the primary network.

18. The network of claim 12, wherein the content comprises high-definition video data.

* * * * *